United States Patent
Goldberg

(10) Patent No.: US 11,111,657 B2
(45) Date of Patent: Sep. 7, 2021

(54) DISINFECTING DRAIN TRAPS SYSTEM

(71) Applicant: BATRIK MEDICAL MANUFACTURING INC., Dorval (CA)

(72) Inventor: Mitchell K. Goldberg, Westmount (CA)

(73) Assignee: THE GOLD KIDS TRUST, Dorval (CA)

( * ) Notice: Subject to any disclaimer, the term of this patent is extended or adjusted under 35 U.S.C. 154(b) by 0 days.

(21) Appl. No.: 16/381,487

(22) Filed: Apr. 11, 2019

(65) Prior Publication Data

US 2019/0323218 A1 Oct. 24, 2019

Related U.S. Application Data

(60) Provisional application No. 62/660,091, filed on Apr. 19, 2018.

(51) Int. Cl.
| | |
|---|---|
| *E03C 1/30* | (2006.01) |
| *E03C 1/122* | (2006.01) |
| *E03C 1/126* | (2006.01) |
| *C02F 1/02* | (2006.01) |
| *C02F 1/46* | (2006.01) |
| *C02F 1/36* | (2006.01) |

(52) U.S. Cl.
CPC ............... *E03C 1/30* (2013.01); *E03C 1/122* (2013.01); *E03C 1/126* (2013.01); *C02F 1/02* (2013.01); *C02F 1/36* (2013.01); *C02F 1/46* (2013.01)

(58) Field of Classification Search
CPC ... E03C 1/126; E03C 1/14; E03C 1/16; E03C 1/182; E03C 1/28; E03C 1/282; E03C 1/284; E03C 1/30; E03C 2001/1206; E03C 1/266-2665; F16L 45/00; F16L 33/00; E03F 9/00-002

See application file for complete search history.

(56) References Cited

U.S. PATENT DOCUMENTS

| | | | | |
|---|---|---|---|---|
| 3,421,939 | A * | 1/1969 | Jacke | B08B 3/12 134/1 |
| 4,192,988 | A * | 3/1980 | Pederson, Jr. | A61L 2/04 134/19 |
| 4,502,164 | A * | 3/1985 | Gemmell | A61L 2/04 4/668 |
| 4,893,361 | A * | 1/1990 | Burns | E03C 1/126 134/1 |
| 6,666,966 | B1 * | 12/2003 | Schluttig | E03C 1/126 210/163 |
| 6,866,780 | B2 * | 3/2005 | Yamada | B02C 19/18 210/175 |
| 9,809,469 | B2 * | 11/2017 | Zereshkian | C02F 1/4606 |

(Continued)

FOREIGN PATENT DOCUMENTS

| | | | | |
|---|---|---|---|---|
| DE | 2747992 | * | 5/1978 | ............ E03C 1/126 |
| EP | WO2016184786 | * | 11/2016 | ............ E03C 1/126 |

*Primary Examiner* — David P Angwin
*Assistant Examiner* — Nicholas A Ros
(74) *Attorney, Agent, or Firm* — BCF LLP

(57) ABSTRACT

A disinfecting drain trap system for reducing the growth of microorganisms in drain traps, the disinfecting drain trap system comprising at least one heating module, one mechanical vibration module; and an off-centered drain trap, wherein the off-centered drain trap comprises at least one collection portion.

17 Claims, 7 Drawing Sheets

(56) References Cited

U.S. PATENT DOCUMENTS

| | | | | |
|---|---|---|---|---|
| 10,428,500 B2* | 10/2019 | Schluttig | ................. | E03C 1/126 |
| 10,655,311 B1* | 5/2020 | Murphy | .................. | E03C 1/182 |
| 2013/0298937 A1* | 11/2013 | O'Donnell | ................ | E03F 9/00 |
| | | | | 134/1 |
| 2018/0195259 A1* | 7/2018 | Swadesh | ................... | E03C 1/30 |

* cited by examiner

DISINFECTING DRAIN TRAPS SYSTEM

FIELD OF TECHNOLOGY

The present technology generally relates to a disinfecting drain traps system to automatically disinfect drain channels.

BACKGROUND INFORMATION

Many recent reports have found multidrug resistant bacteria forming biofilms in hospital sink drainpipes, putting them in close proximity to vulnerable patients. Initially, the bacteria colonize the elbows of the drain pipes. From there, the colonies grow slowly towards the sink strainers at the rate of roughly one inch per day (Kotay et al., Appl. Environ. Microbiol. 24 Feb. 2017, doi: 10.1128/AEM.03327-16), incorporated herein in its entirety by reference. Given the distance in typical hospital sinks of elbows below the sink bowls, it frequently takes a week for the colonies to reach the sink strainers. It is well understood that bacteria splatter around the sink, and even onto the counters surrounding the sink. A risk of bacterial contamination occurs while the water is running into the drain, thereby, transmitting creating an airborne bacterial transmission. Bacterial transmission can even occur via connections in wastewater plumbing to neighboring sinks.

The prevention of growth of microorganisms especially the growth of antibiotic-resistant microorganisms such as the bacterium *Pseudomonas aeruginosa* in drain traps is an important problem that has not been technically solved up to the present day.

The combination of the effect of electromechanical oscillations, in particular ultrasound with elevated temperatures has been described for drain traps in U.S. Pat. No. 6,666, 966, incorporated herein by reference. The effectiveness of the ultrasound and the elevated temperature is a function of many factors including the positioning of the disinfecting system relative to the drain trap as well as the overall configuration of the disinfecting system.

There is thus a need to create disinfecting drain traps systems that have a configuration that are easy to use and install and that allow for efficient disinfection of drain traps.

SUMMARY OF DISCLOSURE

Other aspects and features of the present disclosure will become apparent to those ordinarily skilled in the art upon review of the following description of specific embodiments in conjunction with the accompanying drawings.

According to many aspects, the present technology relates to a disinfecting drain trap system for reducing the growth of microorganisms in drain traps, the disinfecting drain trap system comprising at least one heating module; at least one mechanical vibration module; and an off-centered drain trap, wherein the off-centered drain trap comprises at least one collection portion; wherein the at least one heating module and the at least one mechanical vibration module are in operational alignment with the at least one off-centered collection portion.

According to many aspects, the disinfecting drain trap system of the present technology comprises an off-centered drain trap that is an off-centered P-shaped drain trap.

According to many aspects, the disinfecting drain trap system of the present technology further comprises a drain filling tube.

According to various aspects, the present technology relates to a sink system comprising the disinfecting drain trap system of the present technology, wherein the drain trap of the disinfecting drain trap system is off-centered with respect to the tap outlet of the sink system.

According to many aspects, the off-centered drain trap of the disinfecting drain trap system of the present technology is off-centered with respect to the filing tube by an angled tube connected therebetween. In some implementations, the off-centered drain trap comprises one of the at least one collection portion. In some implementations, the drain filling tube comprises one of the at least one collection portion. In some instances, the drain filling tube restricts flow of liquid draining therethrough. In some implementations, the one of the at least one collection portion the disinfecting drain trap system of the present technology slows down flow of liquid entering the off-centered drain trap.

According to many aspects, the disinfecting drain trap system of the present technology further comprising one or more of a drain plug, a water inlet valve, a circulation loop, a pump, and a drain valve.

According to many aspects, the at least one heating module of the disinfecting drain trap system of the present technology comprises a heat generator. In some implementations, the heat generator is a heating sleeve. In some implementations, the at least one heating module generates a heat having a temperature effective to kill microorganisms and/or effective to prevent growth of microorganisms.

According to many aspects, the at least one mechanical vibration module of the disinfecting drain trap system of the present technology comprises a vibrator to generate vibrations. In some implementations, the at least one mechanical vibration module generates vibrations effective to kill microorganisms and/or effective to prevent growth of microorganisms.

According to many aspects, the disinfecting drain trap system of the present technology comprises a controller. In some implementations, the controller is in operational connection with the at least one heating module and the at least one mechanical vibration module. In some other implementations, the controller is configured to selectively cause the at least on heating module and the at least one mechanical vibration module to be turned on or to be turned off. In some instances, the controller comprises a timer for monitoring the duration of the heating and the vibration treatments by the at least one heating module and the at least one mechanical vibration module.

According to many aspects, the disinfecting drain trap system of the present technology comprises a circulation tube defining a circulation loop increasing the exposure of liquid entering the disinfecting drain trap system to heat and vibrations generated by the at least one heating module and the at least one mechanical vibration module.

BRIEF DESCRIPTION OF THE FIGURES

For a better understanding of the present technology, as well as other aspects and further features thereof, reference is made to the following description which is to be used in conjunction with the accompanying drawings, where.

Figure 1:
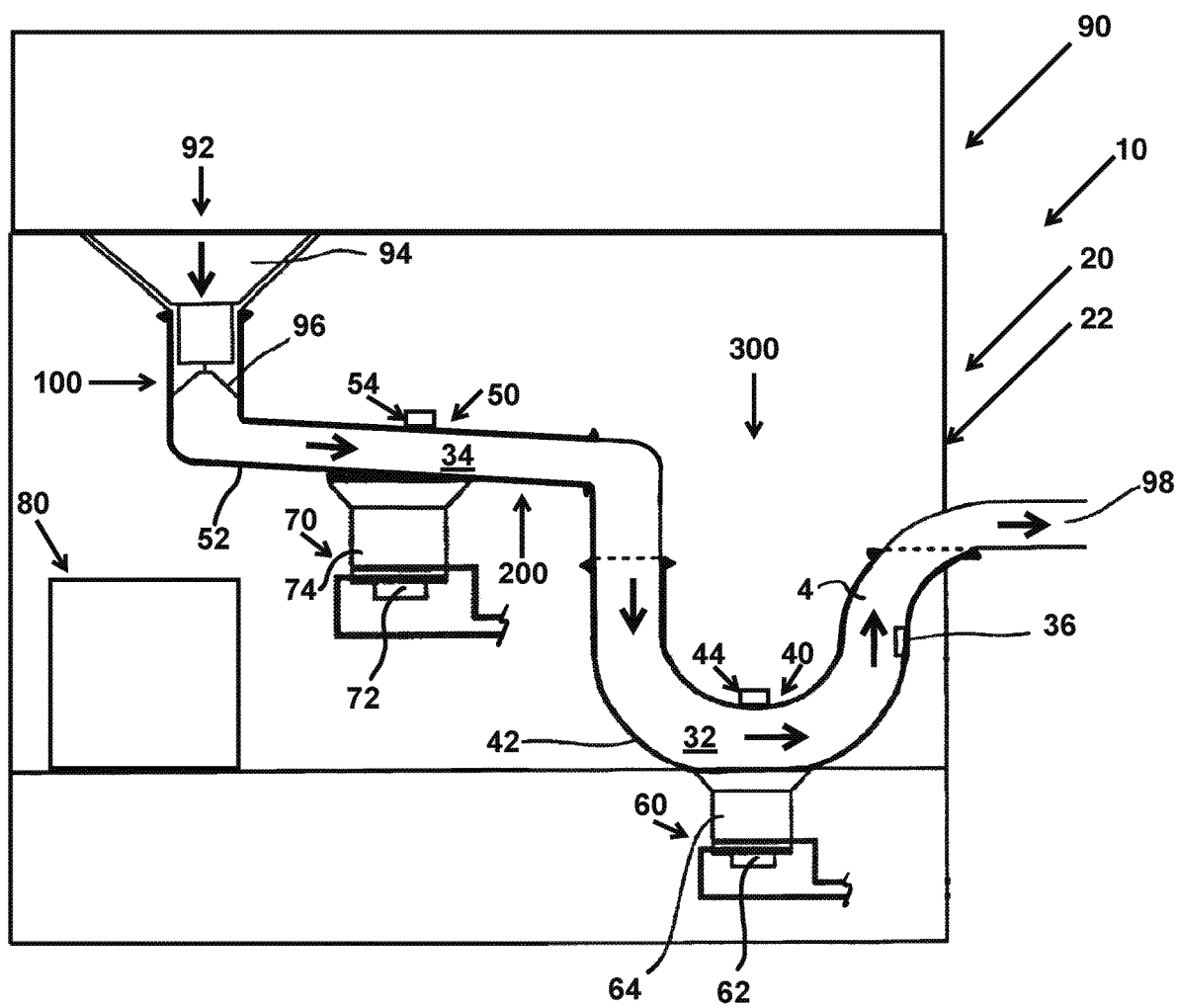
FIG. 1 is a schematic representation of a cross-sectional view of a disinfecting drain trap system according to one embodiment of the present technology, wherein the disinfecting drain trap system comprises an off-centered drain trap that has a P-shaped configuration.
Figure 2:
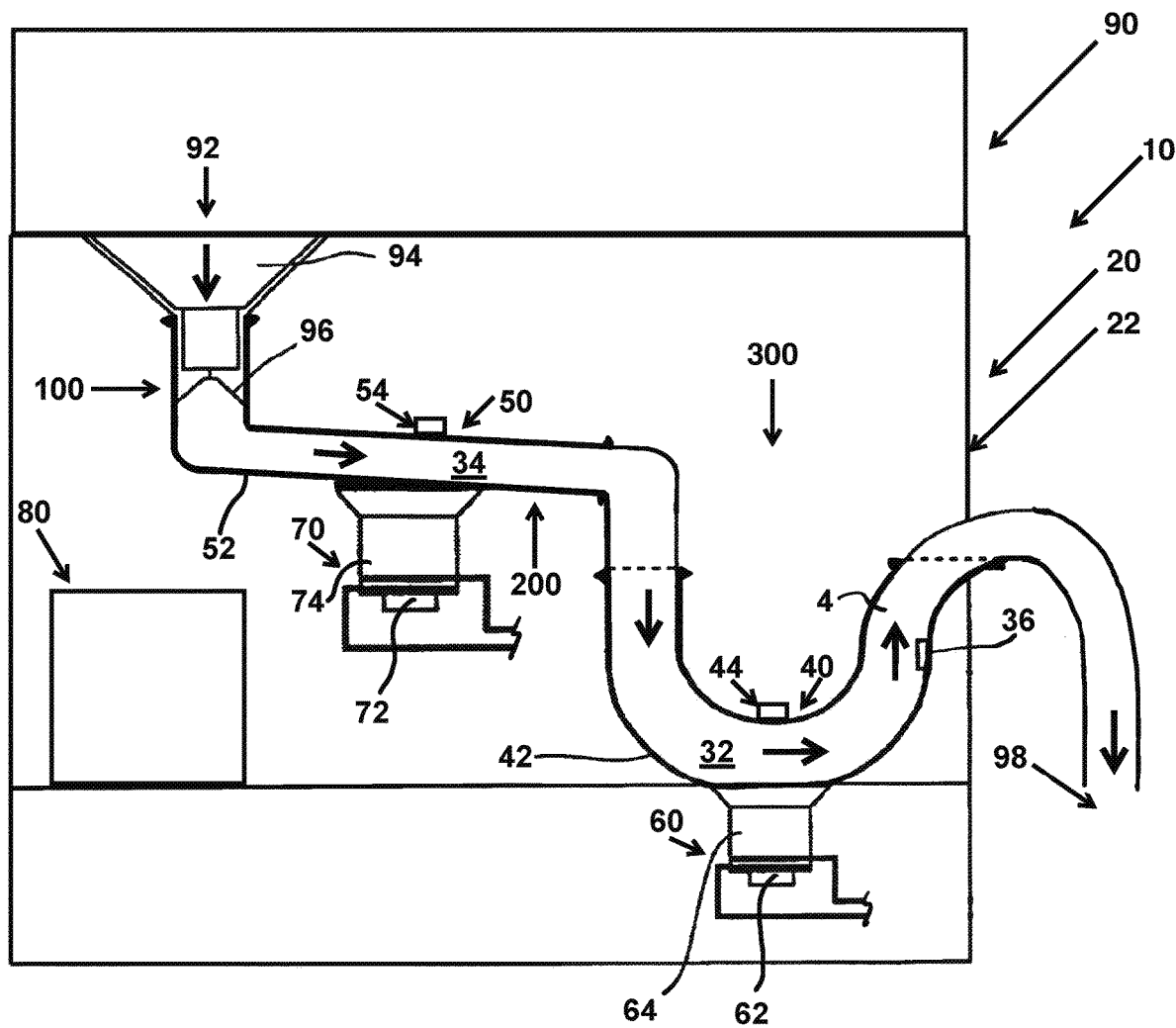
FIG. 2 is a schematic representation of a cross-sectional view of a disinfecting drain trap system according to one embodiment of the present technology, wherein the disinfecting drain trap system comprises an off-centered drain trap that has an S-shaped configuration.
Figure 3:
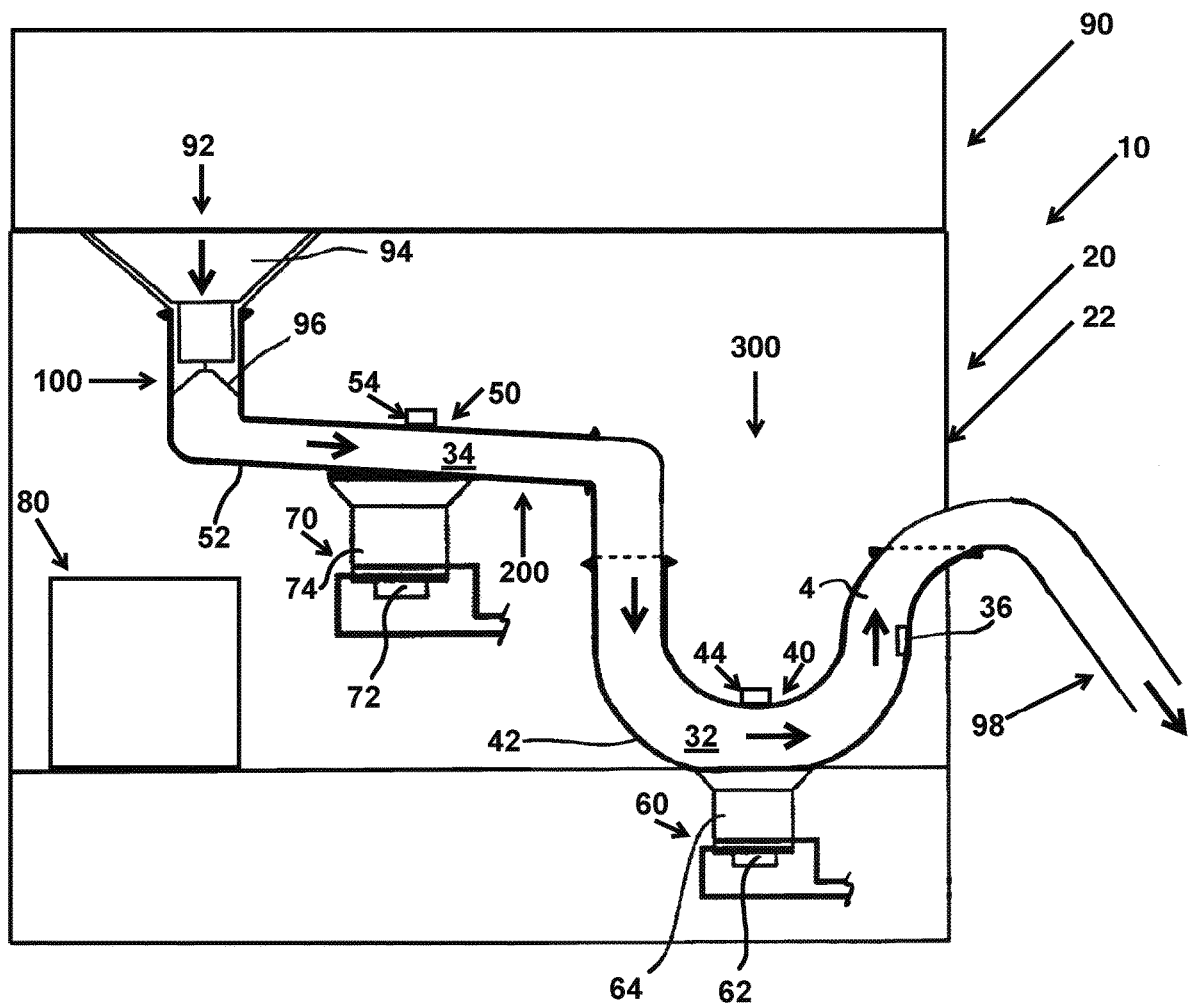
FIG. 3 is a schematic representation of a cross-sectional view of a disinfecting drain trap system according to one embodiment of the present technology, wherein the disinfecting drain trap system comprises an off-centered drain trap that has a Q-shaped configuration.

It should also be noted that, unless otherwise explicitly specified herein, the drawings are not to scale.

DESCRIPTION OF TECHNOLOGY

The present technology is explained in greater detail below. This description is not intended to be a detailed catalog of all the different ways in which the technology may be implemented, or all the features that may be added to the instant technology. For example, features illustrated with respect to one embodiment may be incorporated into other embodiments, and features illustrated with respect to a particular embodiment may be deleted from that embodiment. In addition, numerous variations and additions to the various embodiments suggested herein will be apparent to those skilled in the art in light of the instant disclosure which do not depart from the instant technology. Hence, the following specification is intended to illustrate some particular embodiments of the technology, and not to exhaustively specify all permutations, combinations and variations thereof.

As used herein, the singular form "a," "an" and "the" include plural referents unless the context clearly dictates otherwise.

The term "about" is used herein explicitly or not, every quantity given herein is meant to refer to the actual given value, and it is also meant to refer to the approximation to such given value that would reasonably be inferred based on the ordinary skill in the art, including equivalents and approximations due to the experimental and/or measurement conditions for such given value.

The expression "and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

As used herein, the term "biofilm" refers to any group of microorganisms in which cells stick to each other and often also to a surface.

As used herein, the term "microorganisms" refers to a microscopic organism, which may exist in its single-celled form, or in a colony of cells.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first collection portion" and "third collection portion" is not intended to imply any particular order, type, chronology, hierarchy or ranking (for example) of/between the collection portions, nor is their use (by itself) intended imply that any "second collection portion" must necessarily exist in any given situation. Further, as is discussed herein in other contexts, reference to a "first" element and a "second" element does not preclude the two elements from being the same actual real-world element. Thus, for example, in some instances, a "first" collection portion and a "second" collection portion may be a same collection portion or both have a portion of a same collection portion in common. In other cases, they may be different collection portions entirely.

The present technology stems from the discoverers' realisation that a drain which is not in direct alignment with the tap outlet faucet (i.e., that is off-centered with respect to the tap outlet) reduces the flow of water. Conventional thinking was that a tap outlet needed to be in direct alignment with the drain to reduce splashing and to allow water to quickly pass through the drain. The discoverers found that a drain that is off-centered with respect to the tap outlet, where water exiting the tap outlet comes into contact with the bottom surface of the sink before reaching the drain, reduces the speed of the water entering the drain and reduces aeration and agitation in the drain, thereby reducing the risk of water born bacteria. The discoverers also found that this risk is reduced when the drain is also supported with heat and mechanical vibration to disinfect the drain contents prior to becoming airborne.

The discoverers found that in order to increase the efficiency of a disinfecting drain trap system at killing microorganisms, the system should comprise areas where liquid tends to accumulate. Such areas promote growth and accumulation of microorganisms thereby delimiting the areas where targeted killing needs to occur. In view of this, the originators of the present technology have designed a system wherein the drain trap comprises an off-centered drain where liquid exiting the sink accumulates. In addition to providing a delimited area where microorganism's growth needs to be prevented or decreased, such areas allow to slow down the flow of water circulating through the drain, thereby decreasing the chance of water borne bacterial aeration and splashes.

According to one embodiment, the present technology relates to a disinfecting drain trap system for reducing the growth of microorganisms in the inner walls of drain traps. In some implementations of this embodiment, the disinfecting drain trap system is provided with at least one heating unit and at least one mechanical vibration unit.

In some other implementations of this embodiment, the disinfecting drain trap system is provided with at least one heating module, at least one mechanical vibration module and an off-centered drain trap. In some variants, the off-centered drain trap is a P-shaped drain trap, an S-shaped drain trap, a Q-shaped drain trap or a U-shaped drain trap.

In some other implementations of this embodiment, the disinfecting drain trap system is provided with at least one heating module, at least one mechanical vibration module, an off-centered drain trap and one or more collection portions.

In some other implementations of this embodiment, the disinfecting drain trap system is provided with at least one heating module, at least one mechanical vibration module, a drain filling tube that has an inner helical flange, a drain plug, a water inlet valve, a circulation loop, a pump, a drain valve, a drain trap and one or more collection portions. In some variants, the drain plug is manually or electromechanically operated between sealed and unsealed positions with respect to the drain filling tube.

In some variants, the drain plug is structured and arranged to restrict the flow of liquid draining therethrough.

In some variants, the drain filling tube is structured and arranged to restrict the flow of liquid draining therethrough.

In some variants, the drain trap is a P-shaped drain trap, an S-shaped drain trap, a Q-shaped drain trap or a U-shaped drain trap.

In some variants, the drain trap is an off-centered drain trap.

In some variants, the at least one heating module includes a heat generator. In some variants, the heat generator is shaped as a sleeve wrapped around at least a portion of at least one collection portion.

Referring to FIGS. 1, 2, 3 and 4, in which like parts bear the same reference numerals, there is shown a general assembly of a disinfecting drain trap system 10 according to one embodiment of the present disclosure. The disinfecting drain trap system 10 comprises a casing 20 which may be made of any high-grade steel or other materials that can be provided with an anti-adhering coating 22. The casing 20 encloses an off-centered drain trap 30.

i) Off-Centered Drain Trap

In this embodiment, the off-centered drain trap 30 is a P-shaped off-centered drain trap (FIG. 1) that is off-centered with respect to the filling tube 100 by an angled tube 200 connected therebetween. The off-centered drain trap 30 comprises a first collection portion 32 and a second collection portion 34. Collection portions correspond to portions of the drain trap system 10 where liquids and/or solid materials draining from the sink 90 become stagnant, either due to accumulation or to confinement.

In FIG. 1, liquid and solid materials 4 collected in the first collection portion are shown. In some variations, a level sensor 36 is configured with respect to the first collection portion 32 such that the level of liquid and solid materials stagnating therein may be detected and communicated to the central controller 80. In this embodiment, the second collection portion 32 corresponds to the interior of the drain filling tube 100 and of the adjacent angled portion 200 of the drain trap system 10, and the first collection portion 32 corresponds to the interior of the off-centered drain trap 300. In some instances, the second collection portion 34 slows down the flow of liquid entering the off-centered drain trap 300 and as such tends to reduce the chance of water borne bacterial aeration and splashes.

In some instances, liquids and solid materials may drain from the sink 90 via a sink outlet 92 and into the drain trap system 10, and drain therefrom via a drain outlet 98.

In some instances, the filling tube 100 may be obstructed by a drain plug 94.

In some instances, the filling tube may be obstructed by a closure membrane 96. Under certain circumstances, the closure membrane 96 may be frangible under the pressure imparted downward thereto and toward the off-centered drain trap 300, such as pressure imparted by liquids and solid materials draining from the sink outlet 92. However, the closure membrane 96 may not be frangible under pressure imparted upward thereto and toward the sink outlet 92, such as pressure imparted by a backup of liquids and solid materials or aeration and splashes therefrom.

Figure 4:
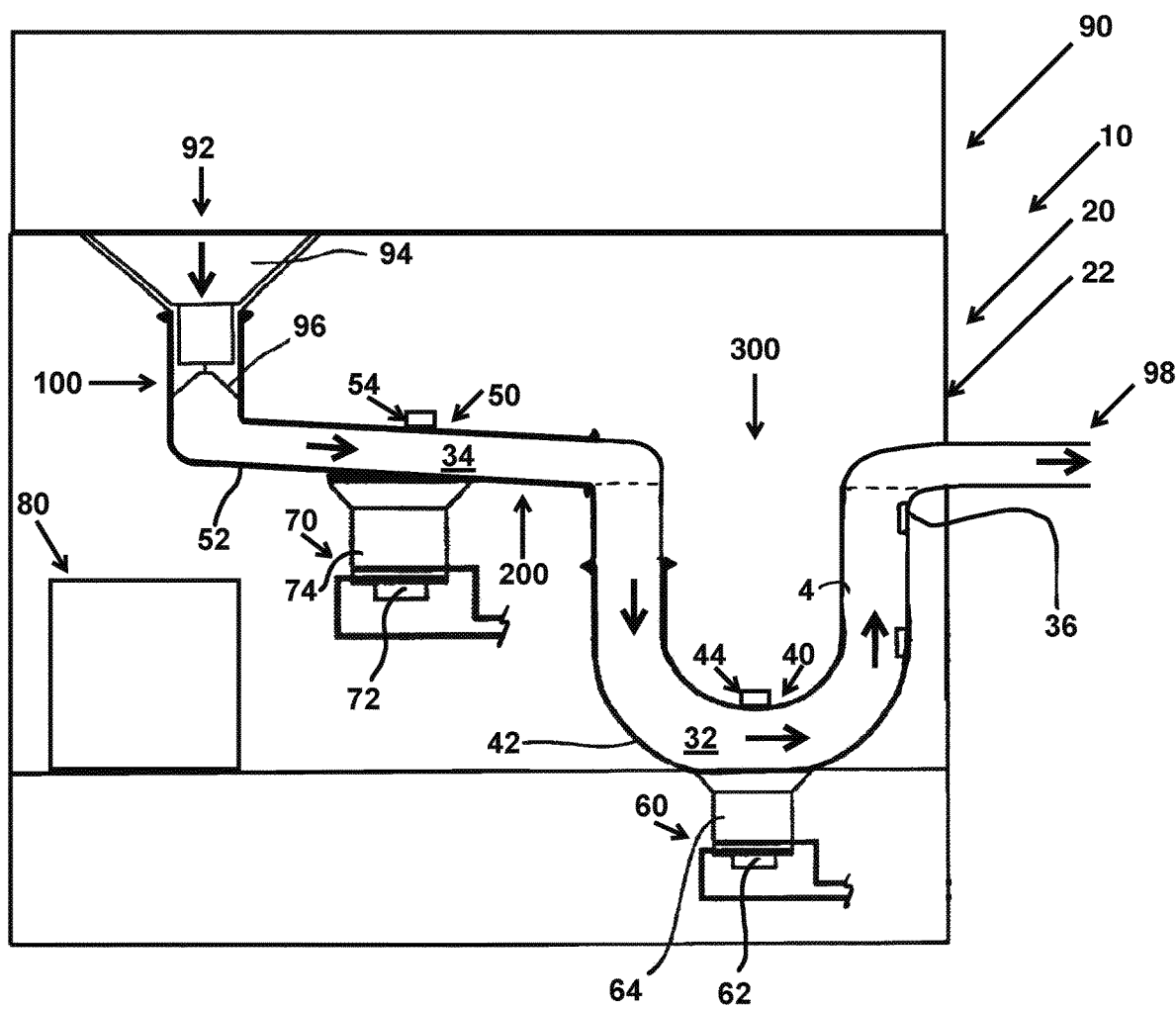
FIG. 4 is a schematic representation of a cross-sectional view of a disinfecting drain trap system according to one embodiment of the present technology, wherein the disinfecting drain trap system comprises an off-centered drain trap that has a U-shaped configuration.

In some other embodiments of the present technology, the off-centered drain trap 300 may be an S-shaped off-centered drain trap (FIG. 2), a Q-shaped off-centered drain trap (FIG. 3) or a U-shaped off-centered drain trap (FIG. 4). In such embodiments, the first collection portion 32 corresponds to the interior of the S-trap (FIG. 2), to the Q-trap (FIG. 3) or to the U-trap (FIG. 4).

In some other embodiments, the off-centered drain trap 300 comprises more than two collection portions. For examples, in some embodiments, the off-centered drain trap 300 comprises at least three collection portions, at least four collection portions, or at least five collection portions.

In some implementations of these embodiments, parts or the entirety of the inner surface of the off-centered drain trap 30 comprises an anti-microbial coating (not shown). In some instances, the anti-microbial coating reduces and/or prevents the growth and/or the adherence of microorganisms in/to the inner surface of the off-centered drain trap 300. In some instances, the anti-microbial coating comprises an anti-microbial agent and/or an anti-adherence agent. In some other instances, the anti-microbial coating is an anti-microbial anti-adherence coating.

ii) Heating Modules

In some embodiments, casing 20 encloses a first heating module 40 and a second heating module 50. The first heating module 40 and the second heating module 50 heat the space immediately surrounding the collection portions so as to heat the collection portions 32, 34 (without causing thermal degradation of the collection portions). The heat is then transferred to the interior of the collection portion 32, 34. In some implementations of these embodiments, at least one of the heating modules is shaped as a jacket wrapping around at least a portion of at least one collection portion.

The first heating module 40 is in operational alignment with the first collection portion 32 where the first heating module 40 is positioned relative to the first collection portion 32 so that it provides sufficient heat to the collection portion 32. The second heating module 50 is in operational alignment with the second collection portion 34 where the second heating module 40 is positioned relative to the first collection portion 32 so that it provides sufficient heat to the collection portion 32. In some implementations, each of the collection portions of the off-centered drain trap passes through a heating module such as illustrated in FIG. 1.

In some other embodiments, casing module 20 comprises more than two heating modules to accommodate other collection portions that may be present in the drain trap 300. For examples, in some embodiments, the casing 20 comprises at least three heating modules, at least four heating modules, or at least five heating modules. It is to be understood that the at least three heating modules, the at least four heating modules or the at least five heating modules are in operational alignment with the at least three collection portions, the at least four collection portions or the at least five collection portions, respectively.

The heating modules 40 and 50 each comprise a heat generator 42, 52, and a thermosensor 44, 54. In some implementations, thermosensors 44, 54 are located exterior to collection portions 32, 34. In some other implementations, thermosensors 44, 54 are located in the interior of collection portions 32, 34. In the Figures, the first heat generator 42 is shaped as a sleeve wrapped around a portion of the first collection portion 32, and the second heat generator 52 is shaped as a sleeve wrapped around a portion of the second collection portion 34.

In some embodiments, heating modules 40, 50, heats collection portions 32, 34 to a temperature effective to kill microorganisms and/or effective to prevent growth of microorganisms. The temperature effective to kill microorganisms and/or effective to prevent growth of microorganisms is not too elevated so as to avoid significant evaporation of liquids from the collection portions. In some instances, the temperature effective to kill microorganisms and/or effective to prevent growth of microorganisms is between about 50° C. and about 75° C., between about 52° C. and about 75° C., between about 54° C. and about 75° C., between about 56° C. and about 75° C., between about 58° C. and about 75° C., between about 60° C. and about 75° C., between about 62° C. and about 75° C., between about 64° C. and about 75° C., between about 66° C. and about 75° C., between about 68° C. and about 75° C., or between about 70° C. and about 75° C.

In some implementations, the heating output of the heating module is between 0.1 watt/ml of liquid confined in the collection portion to about 5 watts/ml of liquid confined in the collection portion. In some other implementations, the heating output of the heating module is between 0.1 watt/ml of liquid confined in the collection portion to about 3 watts/ml of liquid confined in the collection portion. In some other implementations, the heating output of the heating module is between 0.1 watt/ml of liquid confined in the collection portion to about 2 watts/ml of liquid confined in the collection portion. In some other implementations, the heating output of the heating module is between 0.1 watt/ml of liquid confined in the collection portion to about 1 watts/ml of liquid confined in the collection portion.

ii) Mechanical Vibration Modules

In some embodiments, casing 20 encloses a first mechanical vibration module 60 and a second mechanical vibration module 70. The first mechanical vibration module 60 is in functional alignment with the first collection portion 32 and the second mechanical vibration module 70 is in functional alignment with the second collection portion 34.

In some other embodiments, casing module 20 comprises more than two mechanical vibration modules to accommodate other collection portions that may be present in the drain trap 300. For examples, in some embodiments, casing 20 comprises at least three mechanical vibration modules, at least four mechanical vibration modules, or at least five mechanical vibration modules.

The mechanical vibration modules 60 and 70 each comprise at least one vibration generator 62 and 72, respectively and at least one vibration member 64 and 74, respectively. In some implementations, vibration member 64, 74 is located exterior to connection portion 32, 34. In some other implementations, vibration member 64, 74 is introduced directly into the liquid collected in a collection portion.

In some implementations, the vibration treatment by the mechanical vibration module is carried out for 20 minutes at a time at low frequency. In some implementations, the vibration treatment by the mechanical vibration module is carried out for 15 minutes at a time at low frequency. In some implementations, the vibration treatment by the mechanical vibration module is carried out for 10 minutes at a time at low frequency. In some implementations, the vibration treatment by the mechanical vibration module is carried out for 5 minutes at a time at low frequency. In some implementations, the low frequency vibrations are between about 10 and about 100 KHz, or between about 20 and about 75 KHz, or between about 20 and about 50 KHz.

iii) Controller

In some embodiments, casing 20 comprises a central controller 80, operatively and communicatively connected to the first and second heating modules 40, 50 and to the first and second mechanical vibration modules 60, 70. In some variants, central controller 80 is operatively and communicatively connected to level sensor 36. The operative and communicative connection (not shown) between the central controller 80 and the heating modules 40, 50 and the mechanical vibration modules 60, 70 and/or other components of the disinfecting drain trap system 10 could be implemented in several ways, including, but not limited, a direct electrical, cable connection and a wireless connection. The central controller 80 is configured to selectively cause one or more of the heating modules 40, 50 and mechanical vibration modules 60, 70 to be turned on or activated or to be turned off or inactivated such as to control the operations of the disinfecting drain trap system 10. In some implementations, the central controller 80 comprises a timer (not shown) for monitoring the duration of the functions (e.g., heating and vibrations) of the disinfecting drain trap system 10.

In some of these embodiments, the disinfecting drain trap system 10 is in electrical connection (not shown) with a power source (not shown) such as a power outlet so as to provide power to the various modules of the system. In some implementations, the central controller 80 is in electrical connection with a power source and the central controller 80 via a suitable electrical cable or connectors directs power to the various modules of the system (e.g., heating or mechanical vibration modules). In other implementations, the various modules of the system are in direct electrical connection with a power source.

vii) Modes of Operation

In operation, the collection portions 32, 34 are heated by the heating modules 40, 50 to a temperature that is optimal for killing microorganisms and/or for inhibiting the multiplication of microorganisms and held at this temperature for at least the time of the vibration or low frequency treatment. To this end at least one thermosensor 44 can be placed inside or outside the collection portions. The apparatus can be insulated against thermal radiation to the outside by an insulating layer. In some variants, the central controller 80 may adapt operation parameters (e.g. time, temperature and frequency) of at least one of the heating 40, 50 and mechanical vibration 60, 70 modules according to the level of stagnating liquid and solid materials 4 detected by the level sensor 36.

Figure 5:
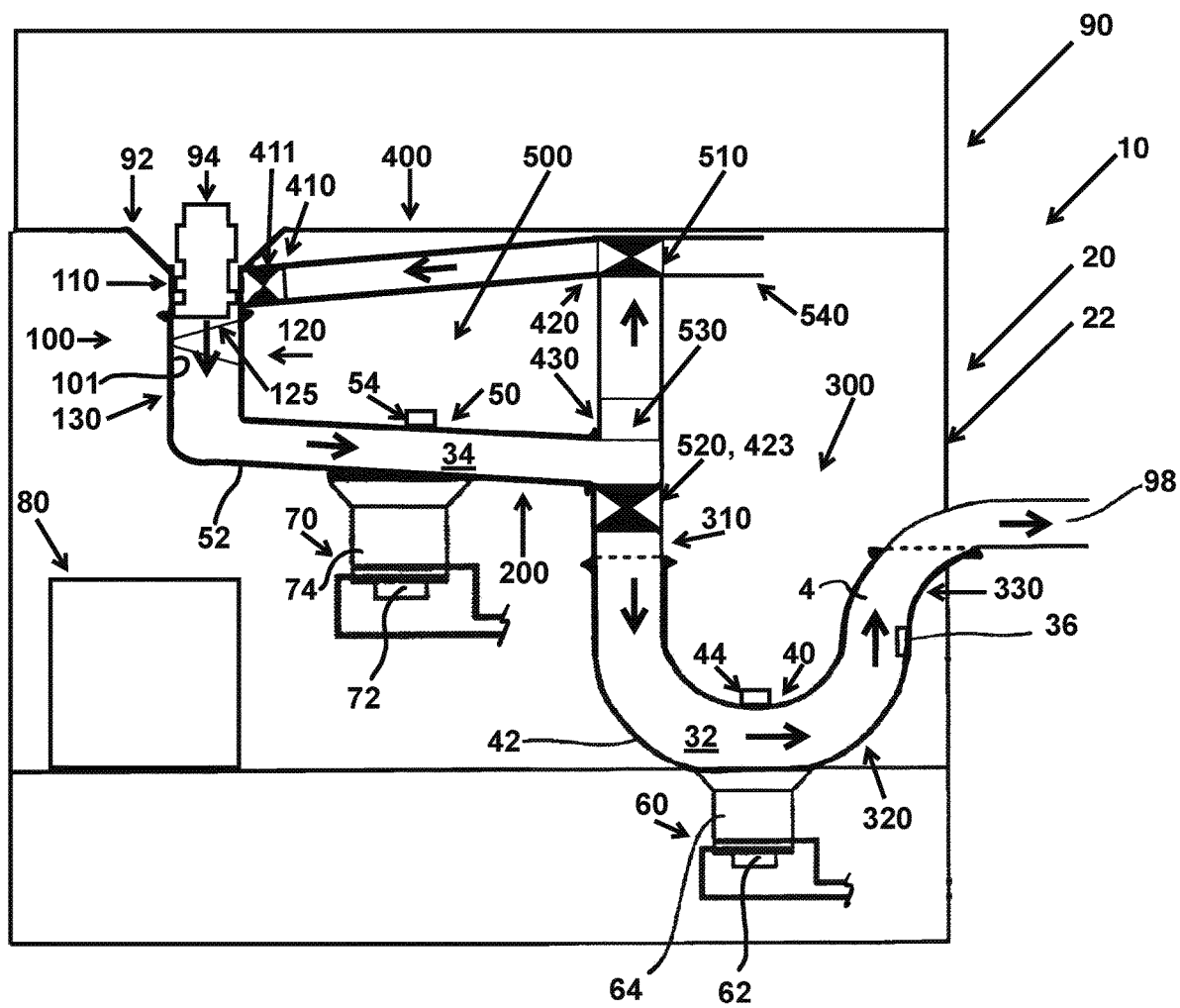
FIG. 5 is a schematic representation of a cross-sectional view of a disinfecting drain trap system according to one embodiment of the present technology, wherein the disinfecting drain trap system comprises a filling tube that has an inner helical flange, a removable drain plug, a water circulation loop, a pump and an off-centered drain trap that has a P-shaped configuration.

Referring to FIG. 5, in which parts bear the same reference numerals as like parts in FIGS. 1 to 4 including some which will not be described again, there is shown a general assembly of a disinfecting drain trap system 10 according to one embodiment of the present disclosure.

In this embodiment, the casing 20 encloses an off-centered drain trap 300 being a P-trap, the off-centered drain trap off-centered with respect to the filling tube 100 by an angled tube 200 connected therebetween. The off-centered drain trap 300 comprises a first collection portion 32 and a second collection portion 34. The collection portions correspond to portions of the drain trap system 10 where liquids and solid materials draining from the sink 90 become stagnant, either due to accumulation or to confinement. In FIG. 5, liquids and solid materials 4 collected in the first collection portion 32 are shown. In this embodiment, the second collection portion 34 corresponds to the interior of the drain filling tube 100 and of the adjacent angled portion 200 of the drain trap system 10, and the first collection portion corresponds to the interior of the off-centered drain trap 300.

The filling tube 100 extends vertically downward from the sink 90 and has a first portion 110 connected to the sink outlet 94 for receiving liquids and solid materials draining therefrom. A second portion 120 of the filling tube 100, extending downward from the first portion 110, has an internal helical flange 125 completing at least one turn. A third portion 130 of the filling tube 100 connects to a first portion 210 of the angled tube 200, the angled tube 200 having a third portion 230 connected to a first portion 310 of the off-centered drain trap 300 via a drain valve (not shown). The helical flange 125 extends radially inward from an inner wall 101 of the filling tube 100 such that no aperture is defined longitudinally from the first portion 110 to the third portion 130. The filling tube 100 and the angled tube 200 are structured and arranged one with respect to the other such that the flow of fluid draining therethrough is laminar or any turbulence thereto is minimized.

In some instances, the second collection portion 34 slows down the flow of liquid entering the stagnant water stagnating in the off-centered drain trap 300, and as such tends to reduce the risk of water borne bacterial aeration and splashes coming therefrom. In addition, the filling tube 100 having the helical flange 125 further tends to reduce the risk of water borne bacterial aeration and splashes coming from any fluid or solid or biofilm accumulated in the angled tube 200.

It is understood that other flow restricting configurations could be used for the filling tube 100.

In the same embodiment, the disinfecting drain trap system 10 further includes a circulation tube 400, a water inlet valve 510, a drain valve 520 and a pump 530.

The drain plug 94 is removably installed in the first portion 110 of the filling tube 100, and is operable between sealed and unsealed positions, the unsealed position allowing fluid to drain through cavities 95 of the drain plug 94 and into the filling tube 100. In some variants, the drain plug 94 is controllable electromechanically via the controller 80 or controllable manually.

The circulation tube 400 has a first portion 410 connected to the first portion 110 of the filling tube 100 via a first valve 411 and a third portion 430 connected to the third portion 230 of the angled tube 200 via a pump 530, which also acts as a second valve 423. The water inlet valve 510 is connected to a second portion 420 of the circulation tube 400, the water inlet valve 510 being connected to a hot water line 540. The drain valve 520 is disposed into the first portion 310 of the off-centered drain trap 300, the first portion 310 connected to the third portion 230 of the angled tube 200. The filling tube 100, the angled tube 200 and the circulation tube 400 define a circulation loop 500.

In some variants, a closure membrane (not shown) may be disposed in the first portion 110 of the filler tube 100, above the first valve 411.

The controller 80 operatively controls the first and second circulation tube valves 411, 423, the drain valve 520, the water inlet valve 510, and the pump 530. When the drain plug 94 is in a sealed position, the drain valve 520 is operatively closed, the first and second circulation tube valves 411, 423 are operatively opened, the water inlet valve 510 is operatively opened and the pump 530 is operated to circulate hot water in the circulation loop 500. In some instances, the circulation of hot water in the circulation loop 500 tends to dislodge biofilm accumulated therein.

In some variants, the controller circulates water confined in the circulation loop 500 for a predetermined circulation cycle, after which the drain valve 520 is opened to drain the circulated water from the circulation loop 500 and into the off-centered drain trap 300. Then, the controller 80 monitors the temperature of the disinfecting drain trap system 10 drain during a cooling cycle via a thermosensor 54. After reaching an adequate temperature, the controller 80 operatively positions the drain plug 94 in the unsealed position.

In some variants having a manually operable drain plug 94, the controller emits an alarm should a user attempt to position the drain plug 94 in the unsealed position during a cooling cycle.

In some variants, heating module and a mechanical vibration module are connected to the circulation tube 400 and operatively controlled by the controller 800 such that heat and vibration can be imparted to the water confined in the circulation loop 500 during the circulation cycle according to heating and vibration cycles, respectively.

Figure 6:
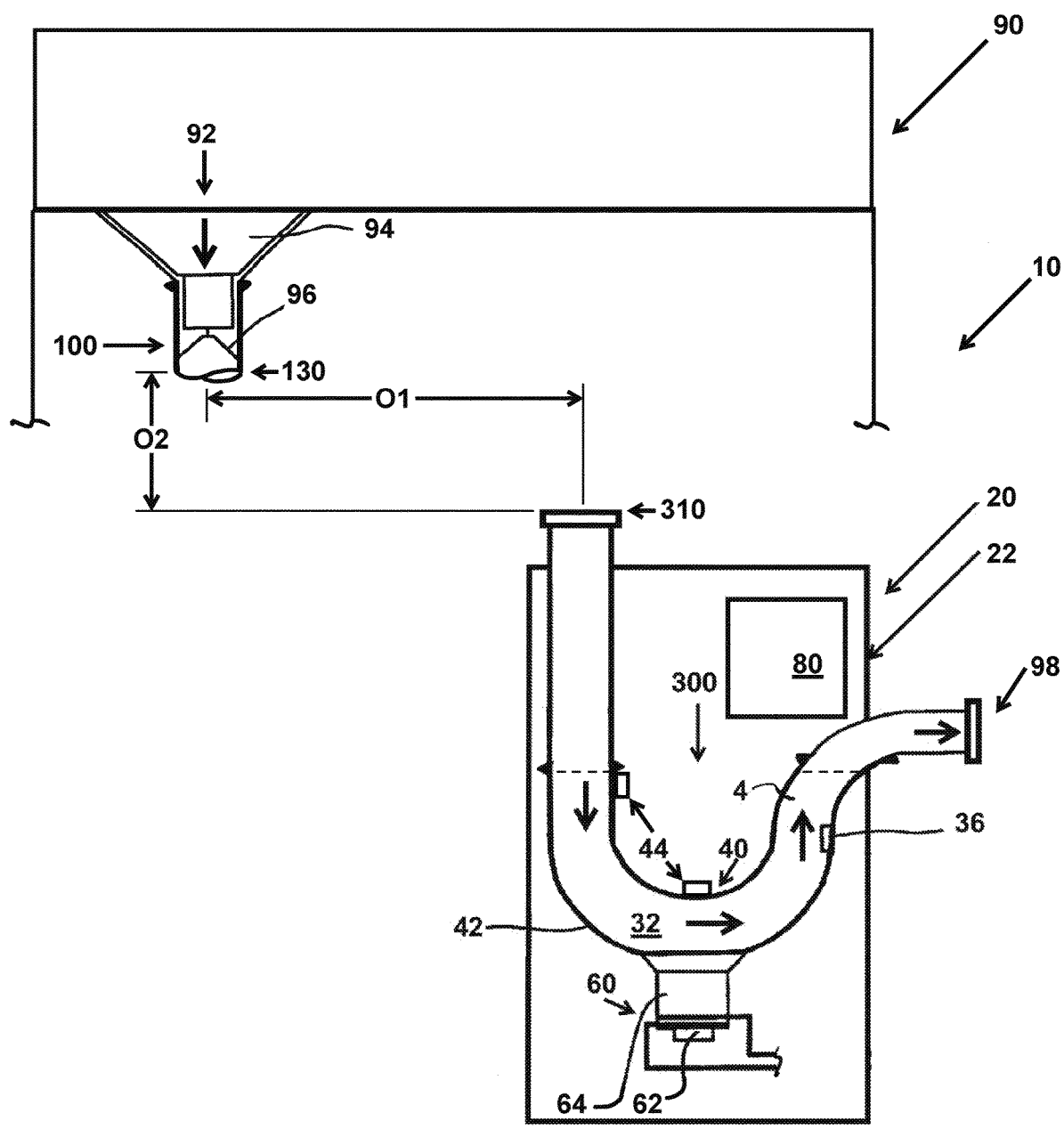
FIG. 6 is a schematic representation of a cross-sectional view of a disinfecting drain trap system according to one embodiment of the present technology, wherein the disinfecting drain trap system comprises an off-centered drain trap that has a customizable offset and a P-shaped configuration.

Referring to FIG. 6, in which parts bear the same reference numerals as like parts in FIGS. 1 to 4 including some which will not be described again, there is shown a general assembly of a disinfecting drain trap system 10 according to one embodiment of the present disclosure.

In this embodiment, casing 20 encloses an off-centered drain trap 300 being a P-trap, the off-centered drain trap 300 being off-centered with respect to the filling tube 100 when at least indirectly connected thereto by an angled tube (not shown). The off-centered drain trap 300 further comprises a first collection portion 32, consisting of a portion of the drain trap system 10 where liquids and solid materials draining from the sink 90 become stagnant, either due to accumulation or to confinement. In FIG. 6, liquids and solid materials 4 collected in the first collection portion 32 are shown. Furthermore, the first collection portion 32 corresponds to the interior of the off-centered drain trap 300 and a second collection portion (not shown) corresponds to the interior of the drain filling tube 100 and of a connected angled tube (not shown).

Still according to the present embodiment, the angled tube is structured and arranged such that when at least indirectly connecting the filling tube 100 to the off-centered drain trap 300, an horizontal offset O1 is defined between the centers (not shown) thereof. In some variations, the at least indirectly connected angled tube defines a vertical offset O2 between the first portion 310 of the off-centered drain trap 300 and the third portion 130 of the filling tube 100. In further variations, the angled tube may be structured and arranged such that liquid and solid materials draining from the angled tube (not shown) and into the off-centered drain trap 300 have a flow rate that is reduced compared to their flow rate when previously draining from the filling tube 100 and into the angled tube. Under certain circumstances, such indirectly connected and off-centered arrangement of the off-centered drain trap 300 with respect to the filling tube 100 tends to reduce the risk of splashing liquid and solid materials 4 and bacterial aeration coming therefrom and potentially emanating from the sink outlet 92.

Identification of equivalent systems, methods and kits are well within the skill of the ordinary practitioner and would require no more than routine experimentation, in light of the teachings of the present disclosure.

Figure 7:
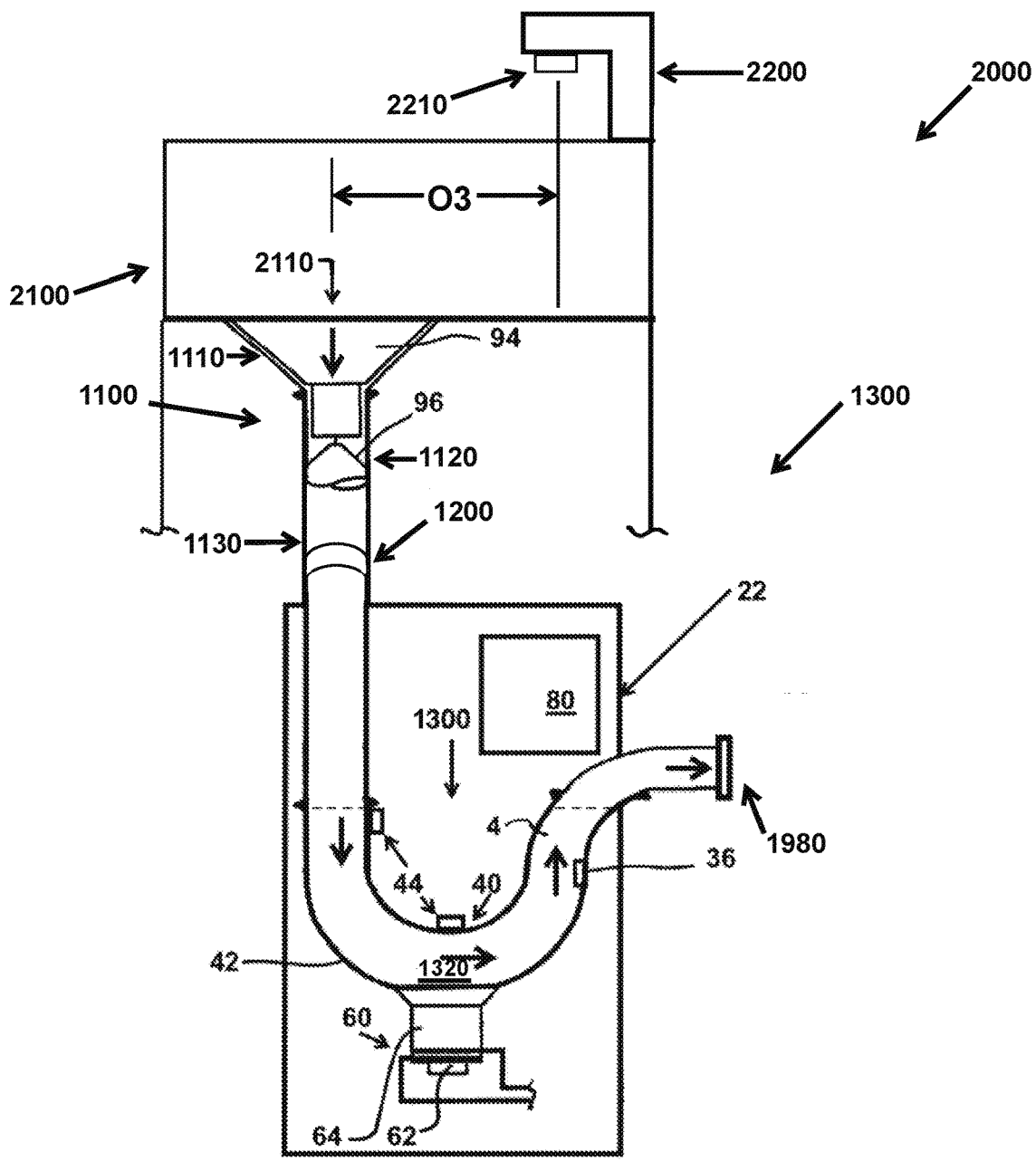
FIG. 7 is a schematic cross-sectional representation of a sink system comprising the disinfecting drain trap system according to one embodiment of the present technology, wherein the disinfecting drain trap system is off-centered with respect to the tap outlet.

In some embodiments, the present technology relates to a sink system 2000 comprising the disinfecting drain trap system 1300 as defined herein. In such embodiments such as illustrated in FIG. 7, the sink system 2000 comprises a sink 2100, a tap 2200 having a tap outlet 2210 and the disinfecting drain trap system 1300. The sink 2100 comprising a sink outlet 2110. The sink outlet 2110 is in fluidic connection with a first portion 1110 of a filling tube 1100 of the disinfecting drain trap system 1300 to drain liquid materials from the sink 2100 into the a drain outlet 1980, the drain outlet 1980 being fluidly connected to the sink 2100 via the filling tube 1110, an angled tube 1200 and the drain trap system 1300. In some implementations, the sink outlet 2110 and the drain trap system 1300 are off-centered with respect to the tap outlet 2210 by an offset O3, such that liquids exiting the tap outlet 2210 do not directly enter into the sink outlet 2110 and the filling tube 1100. Rather, liquids exiting tap outlet 2210 contact the bottom surface of the sink 2100 before draining into the sink outlet 2110.

All documents mentioned hereinabove are incorporated herein by reference in their entirety.

The invention claimed is:

1. A disinfecting drain trap system for reducing the growth of microorganisms in drain traps, the disinfecting drain trap system comprising:
    a drain filling tube;
    and angled tube comprising a first collection portion;
    an off-centered drain trap comprising a second collection portion, wherein the off-centered drain trap is off-centered with respect to the filing tube by the angled tube connected therebetween;
    at least two heating modules; and
    at least two mechanical vibration modules;
    wherein the first collection portion is in operational alignment with at least one of the at least two heating modules and is in operational alignment with at least one of the at least two mechanical vibration modules; and
    wherein the second collection portion is in operational alignment with at least one of the at least two heating modules and is in operational alignment with at least one of the at least two mechanical vibration modules.

2. The disinfecting drain trap system according to claim 1, wherein the off-centered drain trap is an off-centered P-shaped drain trap.

3. The disinfecting drain trap system according to claim 1, wherein the first collection portion slows down flow of liquid entering the off-centered drain trap.

4. The disinfecting drain trap system according to claim 1, wherein the drain filling tube comprises an inner helical flange.

5. The disinfecting drain trap system according to claim 1, further comprising one or more of a drain plug, a water inlet valve, a circulation loop, a pump, and a drain valve.

6. The disinfecting drain trap system according to claim 1, wherein the at least two heating modules generate a heat having a temperature effective to kill microorganisms and/or effective to prevent growth of microorganisms collected on the first and second collection portions.

7. The disinfecting drain trap system according to claim 1, wherein the at least two mechanical vibration modules comprise a vibration member.

8. The disinfecting drain trap system according to claim 1, further comprising a controller connected to the at least two heating modules, and the at least two mechanical vibration modules.

9. The disinfecting drain trap system according to claim 1, wherein heating by the at least two heating modules is intermittent.

10. The disinfecting drain trap system according to claim 1, wherein vibration treatment by the at least two mechanical vibration modules is intermittent.

11. The disinfecting drain trap system according to claim 1, wherein heating by the at least two heating modules is continuous.

12. The disinfecting drain trap system according to claim 1, wherein vibration treatment by the at least two mechanical vibration modules is continuous.

13. The disinfecting drain trap system according to claim 1, wherein the off-centered drain trap comprises of a material for reducing adhesion of dirt and microorganisms.

14. The disinfecting drain trap system according to claim 1, wherein interior surface of the off-centered drain trap is coated with a coating reducing adhesion of dirt and microorganisms.

15. The disinfecting drain trap system according to claim 1, further comprising a circulation tube.

16. The disinfecting drain trap system according to claim 1, wherein the at least two mechanical vibration modules generate vibrations effective to kill microorganisms and/or effective to prevent growth of microorganisms collected on the first and second collection portions.

17. The disinfecting drain trap system according to claim 16, wherein the vibrations effective to kill microorganisms and/or effective to prevent growth of microorganisms have a frequency between 10 and 100 KHz, or between 20 and 75 KHz, or between 20 and 50 KHz.

* * * * *